United States Patent [19]
Walker et al.

[11] Patent Number: 5,469,320
[45] Date of Patent: Nov. 21, 1995

[54] LOW POWER FAN DRIVE CIRCUIT FOR PERSONAL COMPUTERS

[75] Inventors: Richard E. Walker; Hai N. Nguyen, both of Spring, Tex.

[73] Assignee: Compaq Computer Corp., Houston, Tex.

[21] Appl. No.: 145,484

[22] Filed: Oct. 29, 1993

[51] Int. Cl.$^6$ ........................................... H02H 3/00
[52] U.S. Cl. ................... 361/33; 361/18; 361/25; 361/103
[58] Field of Search ................. 361/33, 23, 25, 361/18, 103, 26, 27; 318/471, 254, 473

[56] References Cited

U.S. PATENT DOCUMENTS 5,197,858  3/1993  Cheng ........................................ 318/473

Primary Examiner—A. D. Pellinen
Assistant Examiner—S. Jackson
Attorney, Agent, or Firm—Pravel, Hewitt, Kimball & Krieger

[57] ABSTRACT

An efficient fan drive circuit to drive a variable fan used in a power supply of a personal computer system. The fan drive circuit uses a diode to establish the minimum fan speed during operation in the normal temperature range. The bleeder resistor normally coupled between the fan and a negative output voltage is removed and replaced with a current source. The current source also serves to shut down the power supply if the fan is not operating properly or is not installed. A shut down circuit remains to shut down the power supply when excessive temperature occurs, or when the current source detects that the fan is malfunctioning or not installed.

17 Claims, 1 Drawing Sheet

LOW POWER FAN DRIVE CIRCUIT FOR PERSONAL COMPUTERS

BACKGROUND OF THE INVENTION

1. Field of the Invention

The present invention relates to a low power fan drive circuit to increase the overall efficiency of a power supply in a personal computer system.

2. Description of the Prior Art

A personal computer system typically includes a fan and a fan drive circuit to reduce heat build-up within the chassis of the computer system. The internal ambient temperature of the computer system is allowed to vary between roughly 0° and 70° C. The fan is preferably a variable speed fan having a rotational velocity or speed proportional to the voltage applied across the terminals of the fan. The fan drive circuit senses the ambient temperature within the computer and drives the fan to the appropriate speed based on the ambient temperature. In general, the fan preferably operates at an initial minimum speed at room temperature, with its speed increased if and when the temperature rises.

A variable fan suitable for use in cooling a personal computer system typically requires a voltage ranging between 5 and 15 volts for satisfactory operation. Typical computer systems require a plurality of levels of voltages to operate the circuitry, including high voltage outputs including a positive 12 volt supply, several intermediate output voltages including a positive 5 volt supply, and lower output voltages including a negative 5 volt supply. It has been considered convenient, therefore, to connect the fan between the positive 12 volt supply (+12 V signal) and the negative 5 volt supply (−5 V signal) to achieve the full voltage range for the fan. The +12 V signal was connected to the positive fan terminal. A thermistor circuit was typically provided between the negative fan terminal and the −5 V signal to draw the appropriate amount of current through the fan based on the ambient temperature of the power supply. The thermistor circuit preferably included a thermistor and an emitter-follower transistor circuit, so that the emitter follower transistor was biased by the thermistor to draw more current through the fan when the thermistor sensed an increase in ambient temperature.

A bleeder resistor was provided between the negative terminal of the fan and the −5 V signal to sense the voltage of the fan. A shut down circuit was connected to the bleeder resistor, which operated to shut down the power supply when the negative terminal of the fan dropped below a predetermined minimum voltage level, indicating an inoperative fan or an excessive temperature. The bleeder resistor was very inefficient since a significant current always flowed through it during all operating modes. The current through the bleeder resistor generated heat, causing a loss of energy and efficiency. In fact, upon startup and during normal operation at room-temperature, the voltage across the bleeder resistor was at a maximum, causing the greatest heat and inefficiency. Nonetheless, the bleeder resistor was considered necessary to sense abnormal conditions or high temperature. Thus, the bleeder resistor and its associated inefficiency was tolerated.

Recently, the U.S. Government has promulgated guidelines pursuant to its energy conservation program. Since these guidelines are relatively progressive and difficult to achieve, designers are seeking a plurality of ways to reduce inefficiencies of prior art designs. Therefore, it is considered desirable to improve the efficiency of the fan drive circuit without significantly improving cost while maintaining safe operation.

SUMMARY OF THE PRESENT INVENTION

A low power fan drive circuit according to the present invention significantly increases the efficiency of the fan drive circuit of a computer system, without significantly increasing the cost and while maintaining the safety shutdown feature. The inefficient bleeder resistor is removed and a diode is added between the negative terminal of the fan and the positive 5 volt supply (+5 V signal). Due to the low voltage drop across the diode, the fan receives the sufficient minimum voltage during normal temperature conditions, and the diode consumes very low power compared to the original bleeder resistor. The thermistor circuit is still provided but is clamped off by the diode while the ambient temperature of the power supply is below a predetermined medium level, which is preferably about 30° C. The thermistor circuit is eventually biased on as the temperature increases, and operates to draw more current through the fan when the temperature rises above the predetermined medium level.

A current source is added to replace the function of the bleeder resistor. The current source preferably draws a relatively constant amount of current through the fan during normal operation. If the fan is not installed, installed incorrectly or is not operating properly, the current source saturates and pulls the negative terminal of the fan (or its connector if not installed) towards the minimum voltage level. The shut down circuit detects the voltage drop and shuts down the power supply.

Due to the increased efficiency of a fan drive circuit according to the present invention, power supply internal power consumption is reduced sufficiently, so that when various other power savings are utilized in the computer system, the computer system is able to meet the guidelines of the U.S. Government. The cost of the computer system is not increased by an appreciable amount.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
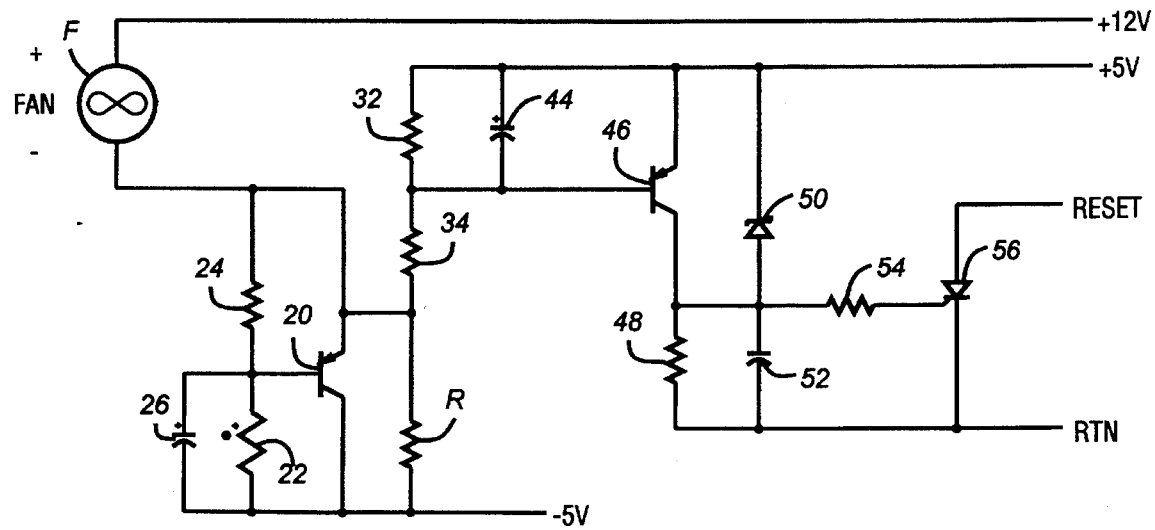
FIG. 1 is a schematic diagram of a fan drive circuit of prior art.

Referring now to FIG. 1, a typical fan drive circuit of prior art is shown. A variable speed fan is shown, referred to by the letter F, which has a speed that is proportional to the voltage applied across its positive and negative terminals. The fan drive circuit is typically part of a power supply (not shown) appropriate to convert power for use by a computer system. However, the fan drive circuit may be a separate circuit from the power supply. The power supply and computer system are not shown for purposes of simplicity. The fan F preferably expects a voltage range of between 5 and 15 volts, so that it is convenient to use the positive 12 volt supply (+12 V signal) and the negative 5 volt supply (−5 V signal) of the computer system.

The positive terminal of the fan F is connected to the +12 V signal and the negative terminal of the fan F is connected to one end of a bleeder resistor R, having its other end connected to the −5 V signal. It is noted that the fan F may be removably connected to the fan drive circuit using an appropriate fan connector to receive the positive and negative terminals of the fan F. Thus, the "negative terminal" of the fan generally refers both to the actual fan terminal and to the connector through which the negative terminal is connected to the fan drive circuitry, as appropriate.

The negative terminal of the fan F is also connected to the emitter of a PNP emitter-follower transistor 20, which is preferably a TIP-117. The base of the transistor 20 is connected to one end of a thermistor 22 and to one end of a capacitor 26, and the collector of the transistor 20 is connected to the −5 V signal. The other ends of the thermistor 22 and the capacitor 26 are connected to the −5 V signal. A resistor 24 is connected between the emitter and base of the transistor 20. The thermistor 22 is preferably a thermally sensitive, solid state, semiconducting device preferably having a negative temperature coefficient of resistance. The thermistor 22 is located in and in appropriate thermal contact with the power supply to detect the internal ambient temperature of the power supply and the computer system.

The +5 V signal is connected to the emitter of a PNP bipolar transistor 46, to one end of a resistor 32 and to one end of a capacitor 44. The other ends of the resistor 32 and capacitor 44 are connected to one end of a resistor 34 and to the base of the transistor 46. The other end of the resistor 34 is connected to the emitter of the transistor 20. The collector of the transistor 46 is connected to one end of a resistor 48, to one end of a capacitor 52, to one end of another resistor 54 and to the anode of a Zener diode 50. The other ends of the resistor 48 and the capacitor 52 are connected to a signal RTN, and the cathode of the Zener diode 50 is connected to the +5 V signal. The RTN signal is a local ground signal which serves as a return path for the +12 V, +5 V and −5 V signals. The other end of the resistor 54 is connected to the gate terminal of a silicon controlled rectifier (SCR) 56, which has its cathode connected to the RTN signal and its anode receiving a signal RESET.

The resistor 24 and the thermistor 22 form a voltage divider between the negative terminal of the fan F and the −5 V signal to appropriately bias the transistor 20 in its active region. The capacitor 26 serves as a filter to prevent sudden changes of the voltage at the base of the transistor 20. In this manner, as the temperature of the power supply rises, the resistance of the thermistor 22 decreases to further bias the transistor 20 on. As the transistor 20 is further biased on, its emitter voltage drops as it draws more current through its emitter and collector through the fan F. Since the fan F speed is varied proportionately according to the voltage across it, the speed of the fan F increases, thereby reducing the increase in heat. Thus, as the speed of the fan F is increased, it tends to reduce the ambient temperature of the power supply and consequently of the thermistor 22, tending to drive the temperature back down.

The transistor 46 is normally biased off during normal operation. The resistor R serves as a bleeder resistor so that the fan F is turning at some minimum speed during ambient conditions to provide certain minimal airflow. The resistor R also forms a voltage divider with the resistors 32 and 34 to detect the level of voltage at the negative terminal of the fan F. If the temperature of the power supply continues to rise in spite of the operation of the fan F, so that the temperature reaches a predetermined maximum level, the voltage across the resistor R drops to bias the transistor 46 on. This predetermined maximum level is preferably about 70° C. When the transistor 46 is turned on, it pulls its collector voltage high, thereby activating the SCR 56. The RESET signal is consequently pulled low. The RESET signal is connected to circuitry (not shown) which shorts the +5 V signal to ground when the RESET signal is pulled low, thereby shutting down the power supply. The Zener diode 50 serves to maintain the +5 V signal at five volts. If the +5 V signal rises to a maximum level, which is preferably 5.6 volts, the Zener diode 50 breaks down and conducts, activating the SCR 56. Again, the RESET signal is pulled low and the power supply is shut down.

The fan circuit of prior art shown in FIG. 1 is relatively inefficient during all modes of operation. During normal operation at room temperature, the resistor R has a significant voltage drop across it so that it absorbs a significant amount of power and generates an appreciable amount of heat. The resistor R generally has a resistance between 100–200 ohms. Since as much as 10–11 volts could appear across the resistor R, it consumes between 0.5 to 1.3 watts. This power is converted to heat. The heat of the resistor R represents a loss of energy, causing reduced efficiency of the power supply, and thus the computer system. Although the fan circuit shown in FIG. 1 is relatively inefficient, the resistor R was considered necessary as a safety factor to detect excessive temperature. Efficiency was a secondary consideration. However, with the promulgation of the guidelines by the U.S. Government, efficiency has become more important. Therefore, it is desired to improve the efficiency of the fan circuit to allow a computer system to meet the guidelines of the U.S. Government while maintaining safe operation.

Figure 2:
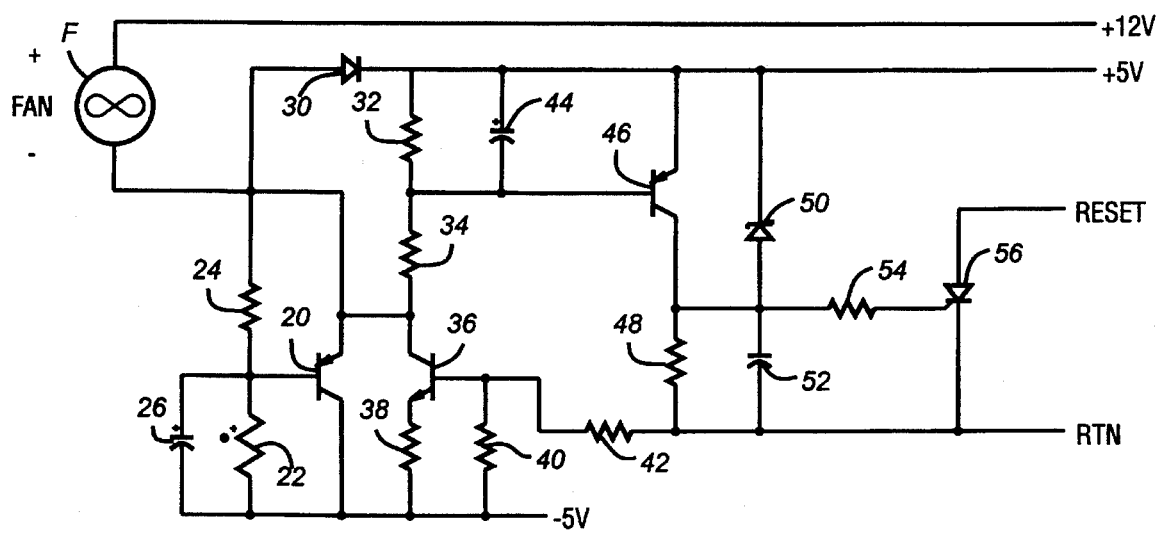
FIG. 2 is a schematic diagram of a fan drive circuit according to the present invention.

Referring now to FIG. 2, a schematic diagram is shown of a fan drive circuit according to the present invention. In FIG. 2, all of the same components as shown in FIG. 1 are the same or similar, except that the resistor R is removed. Thus, similar components retain identical reference numerals. In addition, a diode 30 has its anode connected to the negative terminal of the fan F and its cathode connected to the +5 V signal. The negative terminal of the fan F is connected to the collector of an NPN bipolar transistor 36, which has its emitter connected to one end of a resistor 38. The base of the transistor 36 is connected to one end of a resistor 40 and to one end of a resistor 42. The other ends of the resistors 38 and 40 are connected to the −5 V signal and the other end of the resistor 42 is connected to the RTN signal.

During normal operation when the ambient temperature of the computer system is below a predetermined medium level, the fan receives its operating voltage between the +12 V and +5 V signals through the diode 30. The predetermined medium temperature level is preferably approximately 30° C. The voltage drop across the diode 30 is very small, typically about 0.5 volts, so that the voltage across the fan F is relatively constant at approximately 6.5 volts. Since there is a small voltage drop across the diode 30, it consumes only a modest amount of energy and does not generate a significant amount of heat, in contrast to the resistor R. Also, the fan F receives enough voltage to operate at a sufficient speed for cooling the power supply during normal temperature conditions.

During normal operation and temperature conditions, the diode 30 is forward biased so that the voltage at the emitter of the transistor 20 is clamped to about 5.5 volts. In this manner, the transistor 20 is biased off while the temperature is below the predetermined medium level. However, if the ambient temperature of the power supply reaches or exceeds the predetermined temperature level, which again is preferably 30° C., the resistance of the thermistor 22 is lowered to the point where the transistor 20 begins to turn on. As the transistor 20 turns more fully on with increasing temperature and draws more current, the fan F is driven at a higher speed to cool the power supply, which reduces the temperature back to the normal operating range below the predetermined medium level.

If the temperature of the power supply begins to increase in spite of the fan F, or if the fan F is not installed or is not operating correctly, the temperature rises so that the transistor 20 is fully on. Eventually, the transistor 20 pulls its emitter voltage below 5 volts, turning off the diode 30. The voltage across the resistors 32, 34 may then increase. If the voltage at the emitter of the transistor 20 continues to drop until it reaches a predetermined low level, the transistor 46 is biased on through the resistors 32 and 34. This predetermined low voltage level is preferably about −2 volts. As described above, when the transistor 46 is turned on, the power supply is shut down through the SCR 56.

The transistor 36 operates as a current source, which preferably draws a relatively constant amount of current regardless of the voltage across the fan F. The transistor 36 serves to detect whether the fan F is not installed or is not drawing current. The fan F typically draws about 50–200 mA during most operating modes when operating properly, depending upon the speed of the fan F. In the preferred embodiment, the fan F draws about 10 milliamps (mA) when the fan is stalled. Thus, the transistor 36 is biased to draw about 10 mA. If the fan F is not installed or is not drawing current, the transistor 36 saturates and eventually pulls its collector voltage low through the resistors 32, 34, thereby biasing the transistor 46 on. Of course, this causes the SCR 56 to shut down the power supply.

It can now be appreciated that the fan drive circuit of the present invention significantly increases the efficiency of a power supply without appreciably increasing cost. An inefficient bleeder resistor is replaced with a current source and a diode. The diode is coupled to the positive five volt output voltage instead of the negative 5 volt output voltage, and has a relatively low voltage drop during normal operation. The efficiency is increased since the diode consumes much less energy than the bleeder resistor. A constant current source is provided to pull the voltage of the fan low in high current conditions, or when the fan is not drawing current or not installed. In these conditions, the power supply is shut down.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A fan drive circuit for operating a variable speed fan in a computer system having a power supply providing a high output voltage, an intermediate output voltage and a low output voltage, the fan having its positive terminal receiving the high output voltage and its negative terminal connected to a conductive negative connector when installed, wherein the speed of the fan is determined by the voltage differential between the high output voltage and a voltage applied to the negative connector, said fan drive circuit comprising:

a diode having an anode coupled to the negative fan connector and a cathode for receiving the intermediate output voltage, wherein the fan operates at least at a minimum desired speed;

a thermistor circuit coupled to the negative fan connector and for receiving the low output voltage, said thermistor circuit operative to proportionally lower the voltage of the negative fan connector and increase the speed of the fan as the ambient temperature of the power supply rises above a predetermined medium level;

a current source receiving the low output voltage and coupled to the negative fan connector, said current source operative to pull the negative fan connector to a predetermined minimum level when the fan draws less than a predetermined low level of current; and a shut down circuit receiving the intermediate output voltage and coupled to the negative fan connector, said shut down circuit operative to shut down the power supply when the voltage at the negative fan connector reaches said predetermined minimum level.

2. The fan drive circuit of claim 1, wherein said predetermined medium temperature level is approximately 30° C.

3. The fan drive circuit of claim 1, wherein said predetermined low current level is approximately 10 milliamps.

4. The fan drive circuit of claim 1, wherein said shut down circuit includes a silicon controlled rectifier which shorts the intermediate output voltage to ground in order to shut down operation of the power supply.

5. The fan drive circuit of claim 1, wherein the variable speed fan is removably connected.

6. The fan drive circuit of claim 1, wherein the variable speed fan is provided within the power supply of the computer system.

7. The fan drive circuit of claim 1, wherein said high, intermediate and low voltage outputs are plus twelve volts, plus five volts and minus five volts, respectively.

8. The fan drive circuit of claim 7, wherein said predetermined minimum voltage level is approximately minus two volts.

9. The fan drive circuit of claim 1, wherein the thermistor circuit operates to reduce the voltage at the negative fan connector to said predetermined minimum voltage level when the ambient temperature of the power supply reaches a predetermined maximum level.

10. The fan drive circuit of claim 9, wherein said predetermined maximum temperature level is approximately 70° C.

11. The fan drive circuit of claim 1, wherein said current source draws a relatively constant current from the fan, wherein said constant current has a level approximately equal to said predetermined low current level.

12. The fan drive circuit of claim 11, wherein said current source includes a bipolar transistor, wherein said bipolar transistor saturates and drives the negative fan connector to said predetermined minimum voltage level if the fan is not connected, is not operating or otherwise draws less current than said predetermined low current level.

13. The fan drive circuit of claim 1, wherein said thermistor circuit comprises:

a thermally sensitive thermistor device to detect the ambient temperature; and an emitter-follower bipolar transistor having a base coupled to said thermistor device, an emitter coupled to the negative fan connector and a collector receiving the low output voltage.

14. The fan drive circuit of claim 13, wherein said emitter-follower transistor is biased off by said diode until the ambient temperature exceeds said predetermined medium temperature level, wherein said bipolar transistor is turned on.

15. The fan drive circuit of claim 14, wherein said thermistor circuit operates to proportionately reduce the voltage at the negative fan connector with a rise in temperature above said predetermined medium temperature level.

16. The fan drive circuit of claim 15, wherein said thermistor circuit drives the voltage at the negative fan connector to said predetermined minimum voltage level when the ambient temperature exceeds a predetermined high level.

17. The fan drive circuit of claim 16, wherein said predetermined high temperature level is approximately 70° C.

* * * * *